Figure 1:
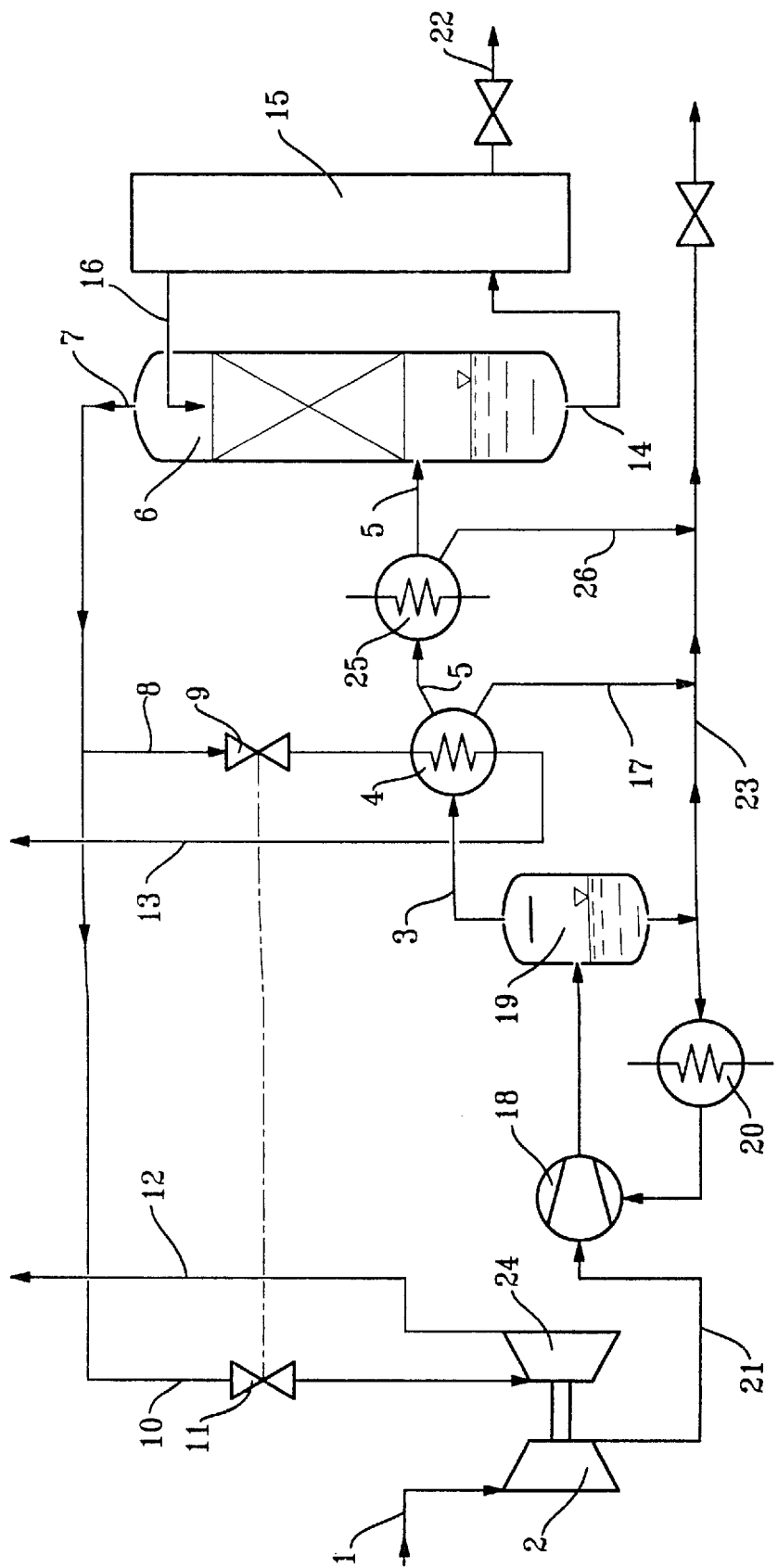

United States Patent [19]
Roth et al.

[11] Patent Number: 5,871,563
[45] Date of Patent: Feb. 16, 1999

[54] PROCESS FOR PURIFYING INERT GASES

[75] Inventors: Peter Roth, Eppstein; Regina Witt, Bad Vilbel; Joachim Burschäpers, Hattersheim; Norbert Schadler, Stockstadt, all of Germany

[73] Assignee: Hoechst Aktiengesellschaft, Frankfurt, Germany

[21] Appl. No.: 650,782

[22] Filed: May 20, 1996

[30]     Foreign Application Priority Data

May 22, 1995 [DE] Germany .................... 195 18 797.0

[51] Int. Cl.[6] ........................... B01D 53/14; B01D 47/00
[52] U.S. Cl. .................... 95/42; 95/186; 95/187; 95/228; 95/237
[58] Field of Search ................... 95/39, 41, 42, 95/149, 156, 186, 187, 228, 229, 237–240

[56]           References Cited

U.S. PATENT DOCUMENTS

| 2,355,167 | 8/1944 | Keith | 95/237 X |
|---|---|---|---|
| 2,947,379 | 8/1960 | Aubrey | 95/237 X |
| 3,589,104 | 6/1971 | Panzarella | 95/237 X |
| 3,824,766 | 7/1974 | Valentine et al. | 55/48 |
| 3,884,652 | 5/1975 | Nicholas | 55/88 |
| 4,126,000 | 11/1978 | Funk | 95/39 X |
| 4,265,088 | 5/1981 | Funk | 95/39 X |
| 4,312,851 | 1/1982 | Isalski et al. | 95/39 X |
| 4,338,101 | 7/1982 | Tuttle | 95/237 X |
| 4,343,629 | 8/1982 | Dinsmore et al. | 95/229 X |
| 4,462,811 | 7/1984 | Dinsmore et al. | 95/237 X |
| 4,542,621 | 9/1985 | Andersson et al. | 95/228 X |
| 4,670,028 | 6/1987 | Kennedy | 95/237 X |
| 4,846,850 | 7/1989 | Webb | 95/156 X |
| 5,071,454 | 12/1991 | Streitberger et al. | 95/237 |
| 5,151,022 | 9/1992 | Emerson et al. | 95/39 X |
| 5,152,812 | 10/1992 | Kovach | 95/41 |
| 5,344,627 | 9/1994 | Fujii et al. | 95/39 X |
| 5,529,612 | 6/1996 | Troost | 95/187 X |

FOREIGN PATENT DOCUMENTS

| 0225864 | 6/1987 | European Pat. Off. . | |
| 0344991 | 4/1960 | Switzerland | 95/149 |

Primary Examiner—Robert Spitzer
Attorney, Agent, or Firm—Frommer Lawrence & Haug LLP

[57]            ABSTRACT

The invention relates to a process for the purification of an inert gas by subjecting the inert gas to a sorption treatment, especially gas scrubs. The invention comprises compressing the inert gas to a higher pressure before the sorption treatment, performing the sorption treatment at this higher pressure, and then expanding the purified inert gas. The advantages of the process of the invention can be seen to be essentially that, for example, streams of waste air which contain as impurities volatile solvents such as methyl chloride, isopropyl chloride, or dichloromethane, can be cleaned up with low consumption of energy and scrubbing liquid. Correspondingly, the equipment can have smaller dimensions.

6 Claims, 1 Drawing Sheet

PROCESS FOR PURIFYING INERT GASES

The invention relates to a process for the purification of an inert gas by subjecting the inert gas to a sorption treatment.

Processes of the type mentioned are known, for example, from Menig: Luftreinhaltung durch Absorption, Adsorption und Oxidation, pp. 268–285, Deutscher Fachschriften-Verlag, Wiesbaden 1977 and are often used for the cleanup of streams of waste air which contain solvents, this use also usually being associated with the recovery of the solvent as a valuable material. The cleanup of a stream of waste air of this type is usually performed by a sorption process, preferably an absorption process, also known as scrubbing, in which, in a known manner, the solvent-containing waste air is passed through a column in counter-current flow to a suitable scrubbing liquid. The solvent or solvents (absorbate) contained in the waste air are absorbed in the scrubbing liquid (sorbent), and the waste air is absorbed only minimally, if at all, so that it is herein termed an inert gas with respect to the solvent. The purified waste air, the inert gas, passes via the head of the column into the atmosphere. However, small amounts of scrubbing liquid are also carried out. The solvents in the loaded scrubbing liquid are removed in a regeneration stage, and are then available as valuable materials. The pressure at which the absorption takes place (absorption pressure) differs only slightly, i.e. up to about 100 mbar, from the pressure at which the waste air is produced (process pressure). The process pressure, as a rule, corresponds to atmospheric pressure.

However, this process is only suitable for the removal of volatile substances such as methyl chloride, isopropyl chloride or dichloromethane from waste air streams to a limited extent, as the requirements for the purity of scrubbed waste air specified in clean air regulations can only be complied with at great cost, for example by increasing the number of theoretical separation stages of the absorption column, by adding an adsorption stage downstream, or by adding a cooling or condensation stage upstream. These measures require high capital investment costs and additional operating costs, and very rapidly lead to physical or technical limitations, such as ice formation on cooling, the necessity for a swing operation between adsorption and desorption for the additional adsorption stage, or the necessity for columns which are too tall, heat exchange surfaces which are too large, or recirculation rates which are too high.

It is an object of the present invention to develop a process which improves the removal of volatile substances and avoids the disadvantages mentioned.

In accordance with the invention, this is achieved by compressing the inert gas to a higher pressure before the sorption treatment, carrying out the sorption treatment at this higher pressure, and expanding the purified inert gas.

The invention accordingly provides a process for purifying an inert gas by subjecting the inert gas to a sorption treatment, which comprises compressing the inert gas to a higher pressure before the sorption treatment, carrying out the sorption treatment at this higher pressure, and expanding the purified inert gas. The sorption process can here be an adsorption process in which the substances, for example solvents, to be removed from the inert gas are adsorbed by a solid, or an absorption process in which the substances are absorbed by a liquid, or a chemisorption process in which the substances are chemically bound, for example in a liquid. The higher pressure can assume all values from 1.1 to 50 bar abs, but can also exceed these values. Preferred values are from 1.2 to 30 bar abs, particularly preferred values are from 1.5 to 10 bar abs and very particularly preferably from 2 to 5 bar abs. The sorbent can advantageously comprise or consist essentially of a glycol ether or a mixture of different glycol ethers. The glycol ether or ethers are preferably selected from the group consisting of polyethylene glycol dimethyl ether, tetraethylene glycol dimethyl ether, pentaethylene glycol dimethyl ether, polyethylene glycol dibutyl ether and diethylene glycol dibutyl ether. In a further embodiment, the sorbent can be purified in a regeneration stage. The energy used for compression can be recovered, at least partially, for example by expanding the purified inert gas via an expansion turbine. In a preferred embodiment, the inert gas can be cooled after compression, which can lead to partial condensation. Here, the cooling produced by the expansion of the purified inert gas can be utilized. For the compression, it is advantageously possible to use a liquid-piston type compressor, where the absorbate is also used as the compressor liquid. The process is especially suitable for the cleanup of waste air streams which contain solvents whose boiling point is above $-10°$ C. at atmospheric pressure. These can be, for example, acetates, aldehydes, alcohols, amines, amides, chlorinated hydrocarbons, esters, ethers, formates, furans, frigens, water and cyclic hydrocarbons.

To carry out the process, it is particularly advantageous to use apparatus comprising a liquid-piston type compressor, wherein a liquid separator is connected downstream of the compressor with the outlet for the separated liquid feeding the inlet for the compressor liquid. A cooling device for the liquid can also be integrated in the apparatus.

The process of the invention is also freely combinable with one or more features of the embodiments.

The advantages of the process of the invention can be seen to be essentially that, for example, streams of waste air which contain as impurities volatile solvents from the groups listed above, such as methyl chloride, isopropyl chloride, or dichloromethane, can be cleaned up with low consumption of energy and scrubbing liquid. Correspondingly, the equipment can have smaller dimensions. The solvents are removed from the scrubbing liquid by partially condensing and separating them after the compression and before the absorption. As a further consequence of the compression, a smaller amount of scrubbing liquid is carried into the atmosphere. Furthermore, existing scrubbers can easily be converted to the process of the invention without the necessity of interrupting the operation.

The invention is explained in more detail below in an illustrative embodiment using the flow diagram shown in the figure.

A solvent-containing waste air stream is fed through an inlet 1 into a precompressor 2 and subsequently via a pipeline 21 into a secondary compressor 18, which is preferably a liquid-piston type compressor. In the secondary compressor 18, the waste air stream is compressed to the absorption pressure, some of the solvent condensing out at this stage. This condensate is separated from the waste air in a separator 19, and is returned via a cooler 20 to the secondary compressor 18 as the liquid of the liquid-piston type compressor. Excess solvent is removed via pipeline 23. The compressed waste air then passes via a pipeline 3 to a condenser 4 in which it can be cooled before it is fed through a pipeline 5 and a further condenser 25 into the base of an absorption column 6. The condensate produced in the condenser 4 or 25 is removed via a pipeline 17 or 26 respectively. In the absorption column 6, the compressed waste air is fed from below in an upward direction, and the solvents are removed from it by a scrubbing liquid which flows in a counter-current direction from above. Suitable absorption columns are preferably packed columns, tray columns, jet scrubbers, or falling film absorbers. The loaded scrubbing liquid is removed via a pipeline 14 from the absorption column 6, and the solvents are removed from it in a regeneration apparatus 15. These pass out of the regeneration apparatus 15 by an exit 22. The purified scrubbing liquid is fed via a pipeline 16 back in the absorption column 6 at the top thereof. The purified waste air is removed from the absorption column 6 at the top at an exit 7, and passed into the atmosphere either via a pipeline 8, an expansion valve 9, the condenser 4, and a pipeline 13, or via a pipeline 10, a valve 11, an expansion turbine 24, and a pipeline 12. The air passing through the expansion valve 9 creates the cooling required for operation of the condenser 4, while passage through the expansion turbine 24 enables part of the energy used for compression to be recovered as a result of the fact that the expansion turbine 24 is connected to the precondenser 2, and so provides energy for the latter. In this arrangement, valves 9 and 11 are linked together so that only one of these can be open at any one time.

The process of the invention is further described by means of a comparative example and an operative example.

COMPARATIVE EXAMPLE

A stream of waste air at a temperature of 20° C. and an absolute pressure of 1 bar, containing 1000 kg/h air and 42.5 kg/h dichloromethane, corresponding to a concentration of about 47 g/m$^3$, was purified by an absorption process as in FIG. 1, but without a compression stage and corresponding energy recovery. The scrubbing liquid used was polyethylene glycol dimethyl ether. The concentration of dichloromethane in the purified waste air stream was 0.93 g/m$^3$.

OPERATIVE EXAMPLE

The same waste air stream as that of the comparative example, but with a dichloromethane concentration of 193 g/m$^3$, was purified at 3 bar abs by the pressure absorption process of the invention. The concentration of dichloromethane, after the compressor stage and before the column, was 158 g/m$^3$. In the purified waste air stream it was below the limit of detection.

In the following, the potential savings of energy and scrubbing liquid is demonstrated by two methods of calculation.

Consumption Using Processes Corresponding to Prior Art

The calculation concerns a waste air stream with a temperature of 20° C. and an absolute pressure of 1 bar, containing 1000 kg/h air, 200 kg/h dichloromethane, and 75 kg/h 2-propanol. The absorption process corresponding to the prior art as in the comparative example was calculated. The scrubbing liquid was assumed to be polyethylene glycol dimethyl ether.

The required maximum concentration of dichloromethane after scrubbing is 30 ppm, and that of 2-propanol 100 ppm.

Calculation with various numbers of theoretical separation stages were carried out. The following table shows the number of separation stages of the absorption column and its height, and the most important energy quantities that are required for treating the scrubbing liquid.

| | | | |
|---|---|---|---|
| Number of separation stages | 10 | 6 | 4 |
| Height of column [m] | 14 | 9 | 7 |
| Flow rate of scrubbing liquid [kg/h] | 2300 | 3000 | 5700 |
| Consumption of cooling energy* [kW] | 27 | 35 | 67 |
| Consumption of regeneration energy** [kW] | 14.2 | 18.5 | 35.2 |
| Total energy consumption [kW] | 41.2 | 53.5 | 102.2 |

*Energy for cooling the scrubbing liquid from 30 to 10° C.
**Energy for heating the scrubbing liquid from 140 to 150° C.

Consumption Using the Process of the Invention

The same waste air stream was calculated according to the process of the invention. It was assumed here that the waste air stream was brought by compression to an absolute pressure of 3 bar to the same purity and that the purified waste air was utilized for cooling. The following table shows the corresponding mass and energy balance:

| | | | |
|---|---|---|---|
| Number of separation stages | 10 | 6 | 4 |
| Height of column [m] | 14 | 9 | 7 |
| Flow rate of scrubbing liquid [kg/h] | 1200 | 1400 | 2200 |
| Consumption of cooling energy* [kW] | 14 | 16 | 26 |
| Consumption of regeneration energy** [kW] | 7.4 | 8.6 | 13.6 |
| Consumption of compression energy [kW] | 50 | 50 | 50 |
| Total energy consumption [kW] | 71.4 | 74.6 | 89.6 |

*Energy for cooling the scrubbing liquid from 30 to 10° C.
**Energy for heating the scrubbing liquid from 140 to 150° C.

In the condenser before the absorption column, 38 kg/h dichloromethane and 53 kg/h 2-propanol are produced. The calculations reveal the following:

The consumption of scrubbing liquid is virtually twice as large in the absorption without compression than in the absorption with compression. This necessitates larger equipment dimensions—especially for the heat exchangers in the wash cycle.

The cooling and regeneration energy requirements are considerably lower in the case of absorption with compression; so is the energy sum total including the compression energy requirements when the number of separating stages (installed height) is small.

Further advantages are:

The condensation of about 91 kg/h of solvent (38 kg/h of dichloromethane+53 kg/h of 2-propanol) upstream of the absorption column. This proportion does not pass into the scrubbing liquid and thus relieves the regenerator. The resulting energy and equipment advantages are not included in the calculation.

The losses of scrubbing liquid due to desorption into the waste air are lower in the case of absorption with compression.

We claim:

1. A process for purifying an inert gas having condensable impurities to produce a purified inert gas, by subjecting the inert gas to a sorption treatment, which comprises compressing the inert gas to a higher pressure to at least partially condense and separate the condensable impurities of the inert gas before the sorption treatment and carrying out the sorption treatment at this higher pressure, and expanding the purified inert gas, thereby removing the condensed impurities, wherein the inert gas is an organic solvent-containing waste air, the sorption treatment is an absorption process with a liquid sorbent, and the sorbent comprises a glycol ether or a mixture of glycol ethers which are selected from the group consisting of polyethylene glycol dimethyl ether, tetraethylene glycol dimethyl ether, pentaethylene glycol dimethyl ether, polyethylene glycol dibutyl ether and diethylene glycol dibutyl ether.

2. The process of claim 1, wherein the sorbent is purified in a regeneration stage after the sorption treatment.

3. The process of claim 1, wherein the energy used for compression is at least partly recovered after the sorption treatment.

4. The process of claim 1, wherein the inert gas is cooled after compression.

5. The process of claim 4, wherein the cooling effect produced by the expansion is used for cooling purposes.

6. The process of claim 1, wherein the inert gas is compressed to a pressure in the range of 1.1 to 50 bar abs.

* * * * *